United States Patent
Storr et al.

(10) Patent No.: US 10,160,651 B2
(45) Date of Patent: Dec. 25, 2018

(54) DISPERSION AND METHOD FOR THE PRODUCTION THEREOF

(71) Applicants: FutureCarbon GmbH, Bayreuth (DE); Graphit Kropfmuehl GmbH, Hauzenberg (DE)

(72) Inventors: Ulrich Storr, Ulm (DE); Stefan Forero, Bayreuth (DE); Werner Handl, Altdorf (DE)

(73) Assignees: FUTURECARBON GMBH, Bayreuth (DE); GRAPHIT KROPFMUEHL GMBH, Hauzenberg (DE)

( * ) Notice: Subject to any disclaimer, the term of this patent is extended or adjusted under 35 U.S.C. 154(b) by 0 days.

(21) Appl. No.: 15/276,393

(22) Filed: Sep. 26, 2016

(65) Prior Publication Data
US 2017/0008770 A1    Jan. 12, 2017

Related U.S. Application Data

(62) Division of application No. 11/991,755, filed as application No. PCT/DE2006/001559 on Sep. 6, 2006, now abandoned.

(30) Foreign Application Priority Data

Sep. 9, 2005    (DE) .................. 10 2005 043 054

(51) Int. Cl.
| | | |
|---|---|---|
| H01B 1/24 | (2006.01) | |
| C01B 31/04 | (2006.01) | |
| B82Y 30/00 | (2011.01) | |
| B82Y 40/00 | (2011.01) | |
| C08J 3/09 | (2006.01) | |
| C08K 3/04 | (2006.01) | |
| C09K 5/14 | (2006.01) | |
| H01B 1/04 | (2006.01) | |
| C01B 32/05 | (2017.01) | |
| C01B 32/174 | (2017.01) | |
| C01B 32/20 | (2017.01) | |
| C08L 1/28 | (2006.01) | |
| C08L 23/04 | (2006.01) | |

(52) U.S. Cl.
CPC .............. *C01B 31/04* (2013.01); *B82Y 30/00* (2013.01); *B82Y 40/00* (2013.01); *C01B 32/05* (2017.08); *C01B 32/174* (2017.08); *C01B 32/20* (2017.08); *C08J 3/095* (2013.01); *C08J 3/097* (2013.01); *C08K 3/04* (2013.01); *C08K 3/041* (2017.05); *C08L 1/286* (2013.01); *C08L 23/04* (2013.01); *C09K 5/14* (2013.01); *H01B 1/04* (2013.01); *C01B 2202/06* (2013.01); *C01B 2202/28* (2013.01); *C01B 2202/36* (2013.01); *C08J 2371/00* (2013.01); *C08K 2201/001* (2013.01); *C08K 2201/005* (2013.01); *C08K 2201/011* (2013.01)

(58) Field of Classification Search
CPC .............. H01B 1/04; H01B 1/18; H01B 1/24
See application file for complete search history.

(56) References Cited

U.S. PATENT DOCUMENTS

2005/0224764 A1* 10/2005 Ma ....................... C09D 5/24
                                                                    252/500

FOREIGN PATENT DOCUMENTS

WO    WO 03107359    * 12/2003

* cited by examiner

*Primary Examiner* — Haidung D Nguyen
(74) *Attorney, Agent, or Firm* — Kriegsman & Kriegsman

(57) ABSTRACT

Dispersion and method for the production of same. In one embodiment, the dispersion consists of a dispersing liquid and at least one solid substance that is distributed in the dispersing liquid. In order to obtain a dispersion with particularly good properties, it is provided that the dispersing liquid has an aqueous and/or non-aqueous base, that the at least one solid substance is formed of graphite and/or of carbon nanomaterial and/or of coke and/or of porous carbon, and that the at least one solid substance is distributed homogeneously and stably in the dispersing liquid. A method for the production of such a dispersion is provided such that the dispersion is produced by applying a strong accelerating voltage. In addition, various advantageous uses of such a dispersion are indicated.

16 Claims, No Drawings

DISPERSION AND METHOD FOR THE PRODUCTION THEREOF

CROSS-REFERENCE TO RELATED APPLICATIONS

The present application is a divisional of U.S. patent application Ser. No. 11/991,755, inventors Ulrich Storr et al., filed Mar. 10, 2008, the disclosure of which is incorporated herein by reference.

BACKGROUND OF THE INVENTION

The present invention relates to a dispersion as well as a method for the production thereof.

Dispersions are already known in the most varied compositions and for the most varied fields of application. Dispersions usually consist of at least a dispersing liquid as well as at least one solid substance, which is distributed in the dispersing liquid. Depending on how the dispersion is treated, the latter may have, for example, a liquid or pasty consistency after it has been produced.

SUMMARY OF THE INVENTION

The object of the present invention is to provide a dispersion that possesses particularly good properties, in particular with respect to viscosity and/or stability and/or electrical conductivity and/or thermal conductivity. In addition, an improved method for the production of such a dispersion will be provided. Also, particularly advantageous application possibilities for such a dispersion will be indicated.

This object is achieved according to the invention by a dispersion consisting of a dispersing liquid and at least one solid substance which is distributed in the dispersing liquid, characterized in that the dispersing liquid has an aqueous and/or non-aqueous base, that the at least one solid substance is formed of graphite and/or of porous carbon and/or of carbon nanomaterial and/or of coke and that the at least one solid substance is distributed homogeneously and stably in the dispersing liquid. This object is also achieved by a method for the production of a dispersion as described above characterized in that the dispersion is produced by applying a strong accelerating voltage. This object is also achieved by a use of a dispersion as described above or a dispersion produced by a method as described above characterized in that the dispersion is produced by applying a strong accelerating voltage as an additive for improving the mechanical, electrical or thermal properties of a material, in batteries, storage batteries or capacitors, as a coating on surfaces, as polymer additive, as ink pastes or as reaction partners for polymerizations, as an additive for ceramics, for a ceramic precursor, for a metal, for a metal alloy, for glass, for yarns, for textiles, or for paper, for the production of fibers, of nonwoven materials or of paper, or as an electrostatic shield or as a material for an electrostatic shield. Further advantages, features and details of the invention result from the subclaims as well as the description. Advantages, features and details that are described in connection with the dispersion according to the invention, of course, apply also in connection with the method according to the invention, and vice versa. The same applies to the uses according to the invention.

DETAILED DESCRIPTION OF THE INVENTION

According to the first aspect of the invention, a dispersion is prepared, consisting of a dispersing liquid and at least one solid substance that is distributed in the dispersing liquid. The dispersion is characterized according to the invention in that the dispersing liquid has an aqueous and/or a non-aqueous base, that the at least one solid substance is formed of graphite and/or of carbon nanomaterial and/or of coke and/or of porous carbon and that the at least one solid substance is distributed homogeneously and stably in the dispersing liquid.

A dispersion in the sense of the present invention generally involves a distribution of at least one substance in another substance that is as fine and complete as possible, but wherein a true solution is not formed.

In the dispersion according to the present invention, at least one solid substance is dispersed in a liquid, whereby the solid substance is distributed homogeneously in the liquid and remains stably distributed therein.

The dispersing liquid used according to the invention has an aqueous and/or a non-aqueous base, whereby combinations of these are also particularly permitted. The invention is not limited to specific types of dispersing liquids. Several advantageous, but not exclusive examples will be explained in detail below for this purpose.

For example, numerous organic compounds are considered as non-aqueous dispersing liquids, such as, e.g., polar, nonpolar, ionic; e.g., monohydric or polyhydric alcohols, for example polyols; esters; ketones; amides; carboxylic acids; aldehydes; aliphatic, aromatic, naphthenic hydrocarbons; heterocycles; ionic liquids and any mixtures thereof.

The dispersion has at least one solid substance, wherein, of course, more than one solid substance may also be present. The at least one solid substance is formed of graphite and/or of carbon nanomaterial and/or of coke and/or of porous carbon, whereby the individual materials can be used either individually each time, or also, however, in any combination. Several advantageous, but not exclusive material examples will be explained in detail below for this purpose.

The graphites used may be, for example, natural graphites, synthetically produced graphites and their precursors, intercalated graphites (expanded graphites) and the like.

The carbon nanomaterials, for example, may consist of carbon nanotubes (single-walled and multi-walled), carbon nanofibers (herringbone, platelet, screw-type), nanohorns, nanocones, and the like. Carbon nanotubes are also designated internationally as carbon nanotubes (single-walled and multi-walled); carbon nanofibers are also designated internationally as carbon nanofibers (herringbone, platelet, screw-type).

Calcined, partially graphitized or graphitized cokes can be used, for example, as cokes. The cokes may originate from degassed coal or from petroleum coke.

Combinations of the above-named materials may also be utilized.

According to the invention, it is finally also provided that the at least one solid substance is distributed homogeneously and stably in the dispersing liquid. Very homogeneous dispersions can be prepared from the named materials in the production of these dispersions, in particular, due to process conditions such as, for example, pressure, temperature, shearing forces, and the like.

Advantageously, at least one additive can be added to the dispersion. For example, these may be special stabilizing additives. In particular, special additives may be necessary for stabilizing dispersions due to the high processing pressure and the high shearing forces when the dispersion is produced according to the invention, as described further below. The invention is not limited to specific materials for additives. The following may be used, for example: polyvinyl alcohols, polyvinylpyrrolidones, lignin sulfonates, polysaccharides, such as, e.g., alginates, xanthans, dextrins, starch derivatives, cellulose ether, and the like.

In another embodiment, at least one binder can be added to the dispersion. For example, special organic binders may be added to the initial materials of the dispersion, such as, for example, polyvinylidene fluoride (PVDF), so that during manufacture a homogeneous, stable dispersion can be produced therefrom. For example, a non-aqueous dispersion of N-methylpyrrolidone (NMP) carbon nanotubes and PVDF can be produced, which can be utilized as an additive for improving the electrical and mechanical properties of cathode and anode materials in batteries and storage batteries, for example, for lithium-ion storage batteries.

Advantageously, at least one acid and/or at least one acid-acting compound can be added to the dispersion. The latter may involve, for example, organic acids, such as, e.g., acetic acid, formic acid, malonic acid anhydride, and the like. However, for example, it may also involve inorganic acids, such as, e.g., sulfuric acid, nitric acid, and the like.

In another embodiment, at least one base and/or at least one base-acting compound can be added to the dispersion. The latter may involve, for example, potassium hydroxides, amines, polyethylene imines, and the like.

Advantageously, at least one salt and/or at least one salt-type compound can be added to the dispersion. These materials can be selected, for example, from the group of alkali salts, alkaline-earth salts, metal salts, organic acids or inorganic acids, such as, for example, potassium carbonate or potassium oxalate, whereby the invention is not limited, of course, to the named examples.

In another embodiment, at least one peroxide, such as, for example, hydrogen peroxide, diacetyl peroxide, dibenzoyl peroxide, or the like, and/or at least one boron compound can be added to the dispersion.

Advantageously, at least one reaction partner for a polymerization can be contained in the dispersion. Here, polyols may be used, for example, but the invention is not limited, of course, to the named example.

A dispersion formed according to the preceding embodiments can be produced in a particularly advantageous manner by the method according to the invention, which is described as follows.

According to the second aspect of the invention, a method for the production of a dispersion according to the invention, as described in the preceding, is provided, which is characterized according to the invention in that the dispersion is produced by applying a strong accelerating voltage.

Stable dispersions of graphites and/or carbon nanomaterials and/or cokes and/or porous carbons as well as combinations thereof can be produced with the method according to the invention.

The basic principle of the method is based on the fact that a dispersion is produced by applying a strong accelerating voltage, for example, with the help of additives. Either an aqueous or a non-aqueous dispersion may be used for the dispersion.

Advantageously, the initial product of the dispersion is pumped through a reaction chamber with high acceleration and at high pressure. The dispersal, i.e., the splitting of aggregates and agglomerates into single particles, is achieved by applying an extreme acceleration. The dispersion will be pumped through a reaction chamber at extreme pressure.

Preferably, the initial product of the dispersion is thus pumped through the reaction chamber at a pressure between 500 bars and 5,000 bars. In addition, the pumping through the chamber can be performed with a shearing velocity between 500,000 sec$^{-1}$ and 8,000,000 sec$^{-1}$. In this way, the dispersed particles are extremely accelerated in the reaction chamber. In a preferred embodiment, the pressure amounts to 1,000 bars or to at least approximately 1,000 bars and the shearing velocity amounts to 5,000,000 sec$^{-1}$.

Advantageously, the reaction chamber has at least one dispersion guide with at least one baffle plate, whereby the dispersion is pumped through the dispersion guide equipped with the at least one baffle plate. A dispersion guide generally involves a structural configuration for correctly guiding or leading the dispersion through the reaction chamber.

The extreme shearing stresses that occur in this way tear apart the aggregates and agglomerates so that they are broken down into single particles. The additives that are optionally present in the dispersing liquid prevent re-agglomeration. The additives are selected so that they act either by electrochemical shielding or by steric stabilizing.

Preferably, the at least one dispersion guide can have a three-dimensional channel structure, in particular, a serpentine-shaped channel structure, wherein the dispersion is pumped through the three-dimensional channel structure.

The described method is also suitable for the purpose of mechanically and/or chemically modifying the materials used. For example, graphites can be delaminated and carbon nanotubes or fibers can be unraveled and shortened. It is also possible to chemically alter the materials by means of special additives. For example, the graphite can be modified with boron by adding a special boron compound. It is also possible to modify the surface properties of the materials in a targeted manner. For example, the surfaces of the materials can be modified by using special amines or polyethylene imines. For example, oxygen-containing groups can be produced by using peroxides.

With the method according to the invention, dispersions can be produced with properties that have been unknown up until now, with respect to viscosity, stability, as well as electrical and thermal conductivity. Thus, for example, dispersions of carbon nanotubes can have a very high viscosity even at low concentrations. By combining graphite and carbon nanomaterial, completely new types of dispersions can be produced, which make possible, for example, surface coatings with high electrical conductivity, as well as good mechanical and chemical properties.

Without wishing to bind the dispersal to a specific theory, one can proceed from the fact that compressive and tensile phases are built up by the extreme acceleration of the liquid and these can give rise to forces in the liquid that lead to thickening and thinning of the medium. In this way, due to the flow mechanics, a cavitation is also induced, which tears apart the liquid, so that small cavitation bubbles form, which implode in the liquid due to the underpressure prevailing therein. This has the consequence that the bubbles collapse. In this way, extreme forces that are exercised on the solid particles found in these zones arise particularly at the interfaces with the liquid, so that bonds of solid substances can be broken down. This effect, which is designated cavitation, acts in a way that breaks down material, but in the present case, this is done deliberately for dispersing solid substances.

In addition, the properties of the carrier medium (temperature, vapor pressure, viscosity, dissolved gas quantities), as well as its interaction with the type and concentration of the dispersed solid substance also play a large role. In the flow and cavitation fields, consequently, not only are agglomerates and aggregates torn apart, but primary particles may also be broken down.

Usually, this disintegration or comminution is characterized via percent fracture, comminution ratio and surface increase and increases with increasing particle size and energy absorption. This increase via energy absorption occurs degressively and is accompanied by a broadening of the particle-size distribution. It is thus clearly confirmed, accordingly, on the one hand, that larger particles have a lower strength than smaller particles, and, on the other hand, that with increasing intensity of stress, a state of stress is established that increasingly prevents a further comminution.

It has now been shown surprisingly that this is no longer true without limitation according to the present invention.

The different sizes of cavitation bubbles and the high peripheral energy densities no longer bind the effect of the method according to the invention to specific particle sizes. It has been shown surprisingly that a high effectiveness is given right in the size range of <2 μm.

The dispersion according to the invention as described further above or a dispersion produced by the method according to the invention described further above can be used for a large number of advantageous fields of application.

For example, such types of dispersions can be used as an additive for improving the mechanical, electrical or thermal properties of a material.

In another embodiment, these types of dispersions can be used in batteries and storage batteries, for example, as additives for anodes, cathodes, electrolytes, as activated materials, and the like. These types of dispersions can also be used, for example, in capacitors, for example, as activated materials and additives for so-called supercapacitors.

However, the dispersions may also be used, for example, as a coating on surfaces, for example, as a coating on metal, glass, ceramic, or plastic surfaces, and the like.

These types of dispersions can also be used advantageously as polymer additives, as ink pastes or as reaction partners for polymerizations.

Preferably, such dispersions can also be used as additives for ceramics, for a ceramic precursor, for a metal, for a metal alloy, for glass, for yarns, for textiles, for paper, and the like.

In another embodiment, such dispersions can also be used, for example, for the production of fibers, nonwoven fabrics, paper, and the like.

Such dispersions can also be used advantageously as electrostatic shields or as materials or components for electrostatic shields.

The present invention advantageously relates to the production and use of stable dispersions of graphites, carbon nanomaterials, cokes and combinations thereof. The dispersing liquid base for these dispersions may be of an aqueous as well as of a non-aqueous nature and may contain special stabilizing additives. The materials used may also be modified mechanically and/or chemically by this method.

The invention will now be explained in more detail based on examples, without limiting the invention thereby.

Example 1

20 g of polyethylene glycol, molecular weight of 1500, were dissolved in 700 ml of demineralized water while stirring. After this, 30 g of carboxymethylcellulose sodium salt, degree of substitution 0.8-1.2 were also dissolved while stirring. Subsequently, while continuing the stirring process, 250 g of graphite powder, 99.9% C, a particle size D50 of 2.0 μm, a specific BET surface of 18.3 m$^2$/g and an aspect ratio of 13.2 were added. This preliminary dispersion with a viscosity of 1250 mPa s was then subjected to a shearing velocity of 3,500,000 sec$^{-1}$ at a pressure of 1500 bars. After passage, the graphite had a particle size D50 of 1.4 μm and a specific surface of 26.2 m$^2$/g as well as a viscosity of 6300 mPa s. The graphite particles did not show agglomeration and the increase of surface and viscosity as well as the increase of the aspect ratio from 13.2 to 16.6 showed a delamination along with the dispersal.

Example 2

According to Example 1, 330 g of natural graphite powder to which 15 g of naphthalene sulfonic acid condensation product sodium salt and 5 g of xanthan had been added, were added to 650 ml of demineralized water. The graphite had a particle size D50 of 10.5 μm, a carbon content of 99.98%, a specific BET surface of 7.7 m$^2$/g and an aspect ratio of 14.9. The viscosity of the preliminary dispersion was 830 mPa s. The preliminary dispersion was then subjected to a shearing velocity of 5,800,000, sec$^{-1}$ at a pressure of 2200 bars. After passage, the graphite had a particle size D50 of 6.6 μm and a specific surface of 18.3 m$^2$/g as well as a viscosity of 5900 mPa s. The graphite particles did not show agglomeration and the increase of surface and viscosity as well as the increase of the aspect ratio from 14.9 to 22.1 showed a delamination along with the dispersal.

Example 3

According to Example 1, 10 g of carbon nanotubes (CNT-MW) without additive addition were dispersed in 500 ml of 2-propanol. The carbon nanotubes had diameters of 10-20 nm and lengths of 1-10 μm, and their specific BET surface was 200 m$^2$/g. The preliminary dispersion with a viscosity of 600 mPa s was then subjected to a shearing velocity of 2,500,000 sec$^{-1}$ at a pressure of 1000 bars. After the passage, the dispersion was very pasty and a clear reduction in the degree of looping and nest formation could be observed in the scanning electron micrographs. The carbon nanotubes were shortened to 0.2-4 μm by this method, but the diameters of 10-20 nm were maintained. Likewise, the specific BET surface of 200 m$^2$/g was not changed. A delaminating of the carbon nanotubes could not be established; rather, only a shortening was found. This dispersion was stable for months without additive.

The invention claimed is:

1. A method for the production of a dispersion comprising a dispersing liquid and at least one solid substance, which is distributed in the dispersing liquid, wherein the dispersing liquid has an aqueous and/or non-aqueous base and the at least one solid substance is selected from the group consisting of graphite, porous carbon, carbon nanomaterial, coke, and combinations thereof, the method comprising the step of pumping an initial product comprising the dispersing liquid and the at least one solid substance through a reaction chamber at a pressure between 500 bar and 5,000 bar and at a shearing velocity between 500,000 sec$^{-1}$ and 8,000,000 sec$^{-1}$.

2. The method of claim 1, further comprising the step of adding at least one additive.

3. The method according to claim 1, further comprising the step of adding at least one binder.

4. The method according to claim 1, further comprising the step of adding at least one acid, at least one acid-acting compound or both.

5. The method according to claim 1, further comprising the step of adding at least one base, at least one base-acting compound or both.

6. The method according to claim 1, further comprising the step of adding at least one salt, at least one salt-type compound or both.

7. The method according to claim 1, further comprising the step of adding at least one peroxide, at least one boron compound or both.

8. The method according to claim 1, further comprising the step of adding at least one reactant for a polymerization.

9. The method according to claim 1, wherein the at least one solid substance is distributed homogeneously and stably in the dispersing liquid.

10. The method according to claim 1, wherein the pressure is at least 1,000 bar.

11. The method according to claim 1, wherein the dispersion has a viscosity of at least 5,900 mP·s.

12. The method of claim 1, wherein the non-aqueous base is a polar, nonpolar, or ionic compound or a combination thereof.

13. The method of claim 12, wherein the non-aqueous base is selected from the group consisting of monohydric alcohols, polyhydric alcohols, esters, ketones, amides, carboxylic acids, aldehydes, aliphatic hydrocarbons, aromatic hydrocarbons, naphthenic hydrocarbons, heterocycles, ionic liquids and combinations thereof.

14. The method according to claim 1, wherein the reaction chamber has at least one dispersion guide with at least one baffle plate, and the initial product is pumped through the dispersion guide equipped with the at least one baffle plate.

15. The method according to claim 14, wherein the at least one dispersion guide has a three-dimensional channel structure, and the initial product is pumped through the three-dimensional channel structure.

16. The method according to claim 15, wherein the at least one dispersion guide has a serpentine-shaped channel structure.

* * * * *